March 6, 1945.　　　J. W. HALE　　　2,370,859
BRAKE OR CLUTCH OPERATOR
Filed Aug. 30, 1941
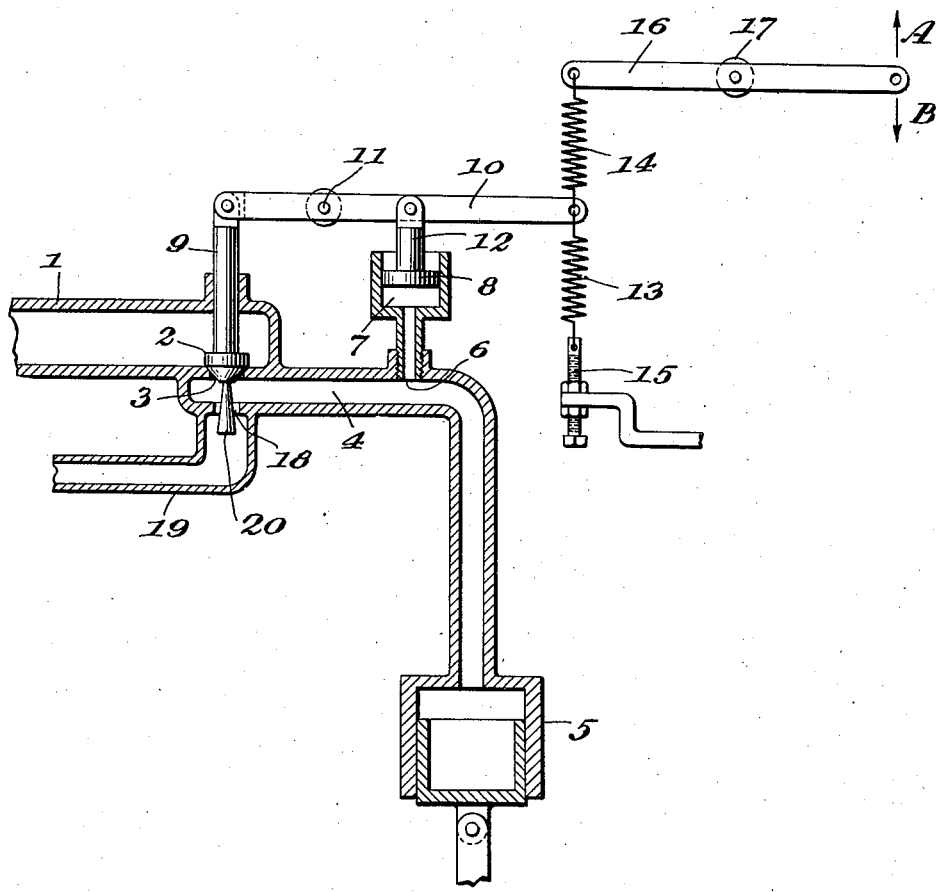
Inventor
Jesse W. Hale
By Spear, Rawlings & Spear
Attorneys.

Patented Mar. 6, 1945

2,370,859

UNITED STATES PATENT OFFICE 2,370,859

BRAKE OR CLUTCH OPERATOR

Jesse W. Hale, Newton, Mass.

Application August 30, 1941, Serial No. 408,924

2 Claims. (Cl. 303—54)

My present invention relates to an operator for pressure operable brakes and clutches.

In the operation of brakes and clutches by fluid under pressure, it is desirable not only to regulate the operating pressure, but also provide means for varying the pressure as desired by the operator. In the operation of brakes, it is necessary to permit the pressure to be increased in relation to the braking action desired in contrast to the disengagement of clutches where the operator must effect a reduction in pressure, unless clutch engagement is effected by springs, in which event, disengagement results from an increase in fluid pressure.

In accordance with my invention, I provide a regulating valve in the delivery conduit to the pressure operable unit or units and provide means to vary the regulating action of the valve. In the preferred embodiment of my invention, the regulating action is under the influence of an operator control and I provide a pressure relief conduit controlled by a valve moved towards its open position as the regulating valve is closed and establishing a bleeder orifice when the regulating valve is open.

In the accompanying drawing, I have shown a fragmentary partly sectioned view of a brake or clutch operator in accordance with my invention from which the novel features and advantages of my invention will be readily apparent.

At 1, I have indicated a conduit from any suitable source, not shown, of fluid under pressure such, for example, as the pressure lubricating systems commonly employed in motor vehicles.

A valve 2 is adapted to close the port 3 between the conduit 1 to the conduit 4 in communication with a pressure operable unit 5 representative of a brake or a clutch, while a port 6 effects communication between the conduit 4 and the cylinder 7 in which I mount a piston 8.

The stem 9 of the valve 2 is under the control of a lever 10 fulcrumed as at 11 and pivotally connected to the stem 12 of the piston 8. The free end of the lever 10 is held by the springs 13 and 14. The spring 13 is adjustably anchored as at 15 and the spring 14 is connected to a lever 16 pivoted at 17 and adapted to be actuated by any suitable operator control, not shown, such as the brake or the clutch. The lever 10 may be considered as being under the influence of a fixed tension, the spring 13 and a variable tension, the spring 14.

It will thus be seen that the pressure of the fluid, supplied to the pressure operable unit 5, may be maintained or regulated as required. For example, if the operator control is to operate a brake or clutch which is engaged by pressure, the brake pedal is connected to the lever 16 to effect its movement in the direction indicated by the arrow A with the result that the valve 2 moves towards its open position under the influence of the spring 13 to effect the braking action desired. Where the operator control is employed to operate a brake or clutch which is engaged by springs, the clutch pedal is connected to the lever 16 to effect its movement in the direction indicated by the arrow B rendering the spring 14 effective to cause the valve 2 to move towards its closed position. In clutch operation in which the clutch is engaged by springs, the spring 13 is initially adjusted to maintain the valve 2 open when the clutch or brake pedal is released. From the foregoing, it will be apparent that my invention is equally well adapted for use where engagement is effected by either springs or pressure, for example, and disengagement is effected by either springs or fluid under pressure.

At 18, I provide a port effecting communication between the conduit 4 and the bleeder conduit 19 by which pressure on the pressure operable unit 5 may be relieved and the fluid returned to its source, if desired. The valve 2 carries a conical valve element 20 disposed to decrease the size of the relief orifice as the valve 2 removes away from its seat so that the conduit 19 serves both as a bleeder conduit and as a relief conduit.

Clutch or brake operators, in accordance with my invention, combine positive operation with flexibility, making them well adapted for efficient service.

What I therefore claim and desire to secure by Letters Patent is:

1. A brake or clutch operator including a source of constant pressure, a pressure responsive brake or clutch operating member, a valve to supply pressure to said member, means to operate said valve, tension members connected to said means and opposing each other in their control of said means to maintain said valve normally in a predetermined position, operator controlled means connected to one of said tension members to vary its effect thereby to cause movement of said valve from said position, a bleeder conduit, a variable choke means in control of the bleeder conduit, the choke means being connected to the operating means for the supply valve to move simultaneously therewith towards its closed position as the supply valve is moved towards its open position thereby to vary the rate of flow through the bleeder conduit.

2. The operator of claim 1 and a pressure operable device intermediate the member and the valves and in control of the valve operating means to move the supply valve towards its closed position and the choke means towards its open position when a predetermined pressure is exerted on the member.

JESSE W. HALE.